(12) United States Patent
Lee

(10) Patent No.: US 7,495,049 B2
(45) Date of Patent: Feb. 24, 2009

(54) MELT PROCESSIBLE FLUOROPOLYMER COMPOSITION CONTAINING NANO PARTICLES

(75) Inventor: Jeong Chang Lee, Shizuoka (JP)

(73) Assignee: Du Pont - Mitsoi Fluorochemicals Co, Ltd., Tokyo (JP)

( * ) Notice: Subject to any disclaimer, the term of this patent is extended or adjusted under 35 U.S.C. 154(b) by 319 days.

(21) Appl. No.: 11/343,569

(22) Filed: Jan. 31, 2006

(65) Prior Publication Data

US 2007/0117900 A1    May 24, 2007

(30) Foreign Application Priority Data

Feb. 4, 2005    (JP) .............................. 2005-029855

(51) Int. Cl.
C08K 3/22    (2006.01)
(52) U.S. Cl. .................. 524/243; 524/432; 524/493; 524/544
(58) Field of Classification Search .............. 524/243, 524/432, 493, 544
See application file for complete search history.

(56) References Cited

U.S. PATENT DOCUMENTS

| 3,013,897 | A | * | 12/1961 | Cupery et al. ............... 428/149 |
| 5,962,553 | A |   | 10/1999 | Ellsworth |
| 6,682,584 | B2 | * | 1/2004 | Pozarnsky et al. ............ 75/332 |
| 2007/0199729 | A1 | * | 8/2007 | Siegel et al. ............... 174/73.1 |

FOREIGN PATENT DOCUMENTS

| JP | 2001 158828 A | 6/2001 |
| JP | 2001152030 A | 6/2001 |
| JP | 2001158859 A | 6/2001 |

OTHER PUBLICATIONS

Kimio Imaizumi et al, "Influence of Dispersibility and Component Ratio in the Silica/Inorganic Salt Solid Mixture", Resources and Material, vol. 118, pp. 202-205, (2002).
Papers of the 13th Symposium of High Polymer Materials, p. 10, (2003).
Toru Noguchi et al, "Structure and Properties for Carbon Nanofiber/Elastomer Composites", Polymer Preprints, Japan, vol. 52, No. 9, pp. 1785-1786, (2003).
Masaki Hirose et al, "Formulation of Organic and Inorganic Nanocomposites by a Physical Method", Journal of the Association of Mining Industry of Japan, vol. 81, p. 24 (1965).
Prof. Dr.-Ing. D. Tech. H. C. H. Rumpf, "Zur Theorie Der Zugfestigkeit Von Agglomeraten Bei Kraftubertragung an Kontaktpunkten", Chemie Ingenieur Technik, vol. 42, p. 538 (1970).
Y. Hiramatsu et al, "Rapid Determination of the Tensile Strength of Rocks With Irregular Test Pieces", UCD 622.831.01:620.11, vol. 81, No. 932, pp. 1024-1030 ('65-12).

* cited by examiner

*Primary Examiner*—Peter D. Mulcahy
*Assistant Examiner*—Henry Hu

(57) ABSTRACT

There is provided a composition of melt processible fluoropolymer and inorganic fine particles of average particle size 1 μm or less dispersed in said fluoropolymer, said composition being obtained by melt-mixing said melt processible fluoropolymer and aggregated said inorganic fine particles, said aggregated inorganic fine particles being obtained by drying a mixed solution of inorganic fine particles and an inorganic salt to obtain a solid material, removing the inorganic salt from this solid material using a solvent, and then drying at a temperature where surface fusion between the inorganic fine particles does not occur, whereby said aggregates are the result of the mutual cohesive force of the inorganic fine particles, which has good physical properties and dimensional stability compared to the melt processible fluoropolymer alone.

15 Claims, 4 Drawing Sheets

MELT PROCESSIBLE FLUOROPOLYMER COMPOSITION CONTAINING NANO PARTICLES

BACKGROUND OF THE INVENTION

1. Field of the Invention

The present invention relates to melt processible fluoropolymer compositions in which inorganic fine particles are dispersed at the primary particle level. More specifically, the present invention relates to a melt processible fluoropolymer composition obtained by melt-mixing a melt processible fluoropolymer and aggregated inorganic fine particles formed by the cohesive force of the inorganic fine particles, wherein the inorganic fine particles are dispersed in the fluoropolymer at the primary particle level.

2. Description of Related Art

Melt processible fluoropolymers such as tetrafluoroethylene/perfluoro(alkyl vinyl ether) (PFA), tetrafluoroethylene/hexafluoropropylene (FEP), tetrafluoroethylene/ethylene (ETFE), have excellent heat resistance, chemical resistance, and low coefficients of friction. However, these fluoropolymers, and the perfluoropolymers in particular because of the weak mutual interaction between the molecules, can have deficiencies in dynamic physical properties (tensile strength, elongation) and dimensional stability under certain conditions; hence a fluoropolymer composition material with superior dynamic physical properties and dimensional stability is needed.

Conventionally, when fluoropolymer compositions with high performance are necessary, improvements in properties such as mechanical strength and dimensional stability are made by dispersing fillers in the polymer. In particular, the method of improving the mechanical characteristics by melt-mixing polymer with an organically treated clay, and then dispersing and breaking up the clay to the nano level, has been employed widely in recent years.

For example, in U.S. Pat. No. 5,962,553, nanocomposite comprising a organically-modified clay (organo-clay) and a fluoropolymer is disclosed. However, in this method there is a problem that a portion of the organic agent used to expand the interlayer space of the clay decomposes at the melt-mixing temperature of the melt processible fluoropolymer, which has high melting point, such as PFA and FEP. Also, in applications that require purity, such as semiconductor device manufacturing, the organic agent constitutes an impurity, and hence it poses problems.

The published Japanese Patent Application 2001-152030 describes a polymer composition, and the manufacture of the same, characterized by the fact that an additive selected from metals, metal salts, and inorganic compounds or a flame retardant is applied in advance to an inorganic porous body of average particle size 100 nm-1000 nm obtained by sintering an inorganic material such as porous glass or silicon dioxide (hereinafter this may be referred to as silica); this is mixed with a molten polymer so as to pulverize the inorganic porous body, and particles with the aforementioned additive or flame retardant of average particle size 10 nm-100 nm are dispersed in the polymer. However, the porous glass described in the gazette contains covalently bonded of silicon and oxygen; significant energy is necessary to pulverize and disperse the porous glass. Hence pulverizing and dispersing, porous glass mixing with molten polymer is very difficult. Also, in an inorganic porous body of average particle size 100 nm-1000 nm made by sintering aggregated inorganic fine particles comprising silica fine particles of average primary particle size 12 nm at 600° C.-700° C., only the surface layers fuse slightly and bond with each other due to surface fusion of silica particles (or aggregated silica particles) during sintering, and solidify into a skeleton with firm bonding (Resources and Material, vol 118, p. 202, 2002). Hence even if melted and mixed with a polymer in a melt-mixing device, the average particle size of the inorganic porous body after melt-mixing with polystyrene (PS) is 290 nm, the particle size distribution is broad at 40 nm-100,000 nm (100 μm), and pulverizing to the level of the original primary particle is not successful (Papers of the 13th Symposium of High Polymer Materials, p. 10, 2003). In particular, in such melt-mixing with polystyrene polymer there is a noticeable deterioration in the dynamic physical properties due to the presence of many sintered aggregates of incompletely pulverized or unpulverized inorganic fine particles of particle size 10 μm or greater.

Also, when melt-mixing inorganic fine particles or inorganic nano particles (fine particles of nanometer dimensions) in a polymer, agglomeration of the fine particles occurs due to the attractive forces of the fine particles because of their high surface to volume ratio. Therefore, it is very difficult to disperse the nanoparticles as is at the nanolevel even if nanoparticles are directly melt-mixed with a polymer.

Furthermore, in recent attempts to manufacture polymer nanocomposites incorporating nanofillers such as carbon nanotubes or carbon nanofibers in a polymer, and to disperse the nanofillers in polymer by melt-mixing, the dispersed state of the nanofillers varies according to the polarity (hydrophilicity being a measure of polarity: more polar polymer is more hydrophilic; as polymer polarity decreases, the polymer becomes more hydrophobic) of the polymer. Uniform dispersion of the nanofillers was possible to some extent in polar polymers such as nitrile rubber. However, it was difficult to evenly disperse the carbon nanotubes in a hydrophobic polymer such as ethylene propylene rubber (EPDM) (Polymer Preprints, Japan, vol 52, p. 1785, 2003). Therefore, it is very difficult to directly disperse carbon nanotubes or other nanofillers in melt processible fluoropolymers such as tetrafluoroethylene/perfluoro(alkyl vinyl ether) (PFA), tetrafluoroethylene/hexafluoropropylene (FEP), which are more hydrophobic than ethylene propylene rubber (EPDM), in the melt-mixing process.

SUMMARY OF THE INVENTION

The present inventors find that by melt-mixing a melt processible fluoropolymer and aggregated inorganic fine particles of low strength formed by the mutual cohesive force of the inorganic fine particles, the aggregated inorganic fine particles are physically pulverized and dispersed at the level of the original inorganic fine particles (which hereinafter may be referred to as primary particles) due to the shear stress generated in the melt-mixing device, and can improve the dynamic physical properties and dimensional stability while maintaining the elongation of the melt processible fluoropolymer and its melt moldability.

The present invention provides a melt processible fluoropolymer composition of excellent dynamic physical properties and dimensional stability wherein the inorganic fine particles are dispersed at the level of primary particles.

The present invention provides a melt processible fluoropolymer composition dispersed with inorganic fine particles having excellent dynamic physical properties and dimensional stability obtained by melt-mixing a melt processible fluoropolymer and aggregated inorganic fine particles of low strength, wherein the aggregate structure is formed due to the relatively weak mutual cohesive force of the adjacent inorganic fine particles.

The present invention provides a melt processable fluoropolymer composition of excellent dynamic physical properties and dimensional stability wherein the inorganic fine particles are pulverized and dispersed evenly in the melt processable fluoropolymer to the primary particle level at a very high purity by preparing in advance weak aggregates of inorganic fine particles of lower strength than the conventional inorganic porous body obtained by sintering an inorganic material such as porous glass or silica, and physically pulverizing and dispersing the aggregated inorganic fine particles of low strength through shear stress while melt-mixing the said aggregate and melt processable fluoropolymer.

The present invention provides a composition of melt processible fluoropolymer and inorganic fine particles of average particle size 1 μm or less, said inorganic fine particles being dispersed in said fluoropolymer, said composition being obtained by melt-mixing said melt processable fluoropolymer and aggregated said inorganic fine particles, said aggregated inorganic fine particles being obtained by (a) drying a mixed solution of inorganic fine particles and an inorganic salt to obtain a solid material,
(b) removing the inorganic salt from this solid material using a solvent, and
(c) drying said solid material to obtain said aggregated inorganic fine particles, both said drying steps being done below the temperature at which surface fusion between the inorganic fine particles occurs, whereby said aggregates are the result of the mutual cohesive force of the inorganic fine particles.

The aforementioned melt processable fluoropolymer composition, wherein said aggregated inorganic fine particles are in the size range of 50 μm to 400 μm.

The aforementioned melt processable fluoropolymer composition, wherein the collapse strength of the aforementioned aggregated inorganic fine particles is 1.5 MPa or less, is a preferred embodiment of the present invention.

The aforementioned melt processable fluoropolymer composition, wherein the average primary particle size of the inorganic fine particles is 1 μm or less, is a preferred embodiment of the present invention.

The aforementioned melt processable fluoropolymer composition, wherein the compressive load of the aforementioned aggregated inorganic fine particles is 40 mN or less, is a preferred embodiment of the present invention.

The aforementioned melt processable fluoropolymer composition, wherein the 80% or more of the inorganic fine particles dispersed in the polymer have a particle size of 600 nm or less, is a preferred embodiment of the present invention.

The aforementioned melt processable fluoropolymer composition, wherein the aforementioned inorganic fine particles are selected from at least one of the group consisting of silicon dioxide, titanium dioxide, aluminum oxide, and compound oxide of zinc oxide and antimony pentoxide, is a preferred embodiment of the present invention.

The aforementioned melt processable fluoropolymer composition, wherein the aforementioned inorganic salt is selected from at least one of the group consisting of ammonium salts, alkaline earth metal salts, or alkali metal salts of hydrohalic acid, phosphoric acid, sulfuric acid, nitric acid, and molybdic acid, is a preferred embodiment of the present invention.

The aforementioned melt processable fluoropolymer composition, wherein the aforementioned inorganic salt is selected from at least one of the group consisting of potassium bromide, potassium chloride, ammonium molybdate, sodium dihydrogen phosphate, calcium chloride, and ammonium bromide, is a preferred embodiment of the present invention.

The aforementioned melt processable fluoropolymer composition, wherein the aforementioned drying is carried out at a drying temperature such that the ratio (To/Tm) of the indicated drying temperature (To) to the melting point (Tm) of the inorganic fine particles is 0.23 or less, said temperatures being in degrees Kelvin.

The aforementioned melt processable fluoropolymer composition, wherein the aforementioned melt processable fluoropolymer is selected from at least one of the group consisting of polymers or copolymers of monomers selected from at least one of the group consisting of tetrafluoroethylene, hexafluoropropylene, chlorotrifluoroethylene, perfluoro (alkyl vinyl ether), vinylidene fluoride, and vinyl fluoride or copolymers of these monomers and ethylene or propylene, is a preferred embodiment of the present invention.

The aforementioned melt processable fluoropolymer composition, wherein the MFR of the aforementioned melt processible fluoropolymer composition is at least 50% of the MFR of the melt processible fluoropolymer, is a preferred embodiment of the present invention.

The aforementioned melt processable fluoropolymer composition, wherein the elongation of the aforementioned melt processible fluoropolymer composition is at least 50% of the elongation of the melt processable fluoropolymer, is a preferred embodiment of the present invention.

DESCRIPTIONS OF THE DRAWINGS

DETAILED DESCRIPTION OF THE INVENTION

Figure 3:
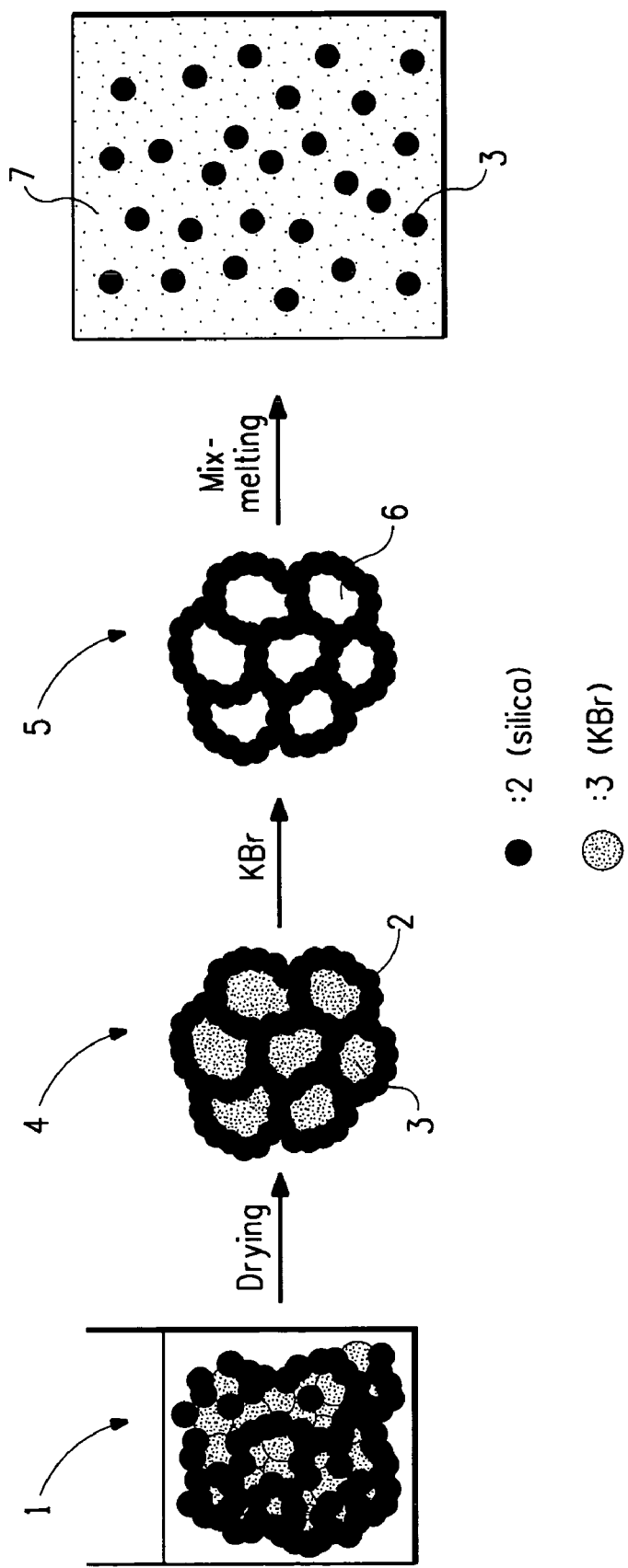
FIG. 3 is a conceptual diagram describing the dispersed state of the silica particles pulverized and dispersed in the melt-mixing process and the procedure for producing the aggregated silica fine particles used in the present invention.

FIG. 3 shows (1) a mixed solution of colloidal silica (sol) and potassium bromide in which (2) represents the primary silica particles and (3) potassium bromide. Aggregate (4) is the result of drying the mixed solution. The aggregate (5) of silica fine particles remains after the potassium bromide has been washed out, leaving the empty volume (6). (7) represents the cross-section of the melt processable fluoropolymer composition wherein the aggregated silica fine particles of the present invention have been pulverized during melt-mixing and are thereby dispersed at the primary particle level in the fluoropolymer matrix.

According to the present invention, a melt processable fluoropolymer composition is provided having excellent dynamic physical properties and dimensional stability wherein the inorganic fine particles are dispersed at the level of the primary particles.

Also, according to the present invention, a melt processible fluoropolymer composition is provided having excellent dynamic physical properties and dimensional stability while maintaining to some extent the elongation and melt moldability of the melt processible fluoropolymer obtained by melt-mixing a melt processible fluoropolymer and aggregated inorganic fine particles through shear stress, and physically pulverizing and dispersing the aggregate in the melt processible fluoropolymer to level of the original inorganic fine particles.

According to the present invention, a melt processible fluoropolymer can be processed to form a nanocomposite because it is possible to disperse the inorganic fine particles in the melt processible fluoropolymer at the nanolevel.

The molded melt processible fluoropolymer nanocomposite product provided according to the present invention has excellent dynamic physical properties, dimensional stability, fire resistance, melt moldability, and abrasion/wear proof characteristics. It has utility in various molded products.

The present invention provides a melt processible fluoropolymer composition having excellent dynamic physical properties and dimensional stability wherein the inorganic fine particles are dispersed in the fluoropolymer at the level of the primary particles by melt-mixing the melt processible fluoropolymer and aggregated inorganic fine particles and physically pulverizing and dispersing the aggregate.

The present invention provides a composition of melt processible fluoropolymer wherein the inorganic fine particles are dispersed in the polymer at average particle size of 1 µm or less this being obtained by melt-mixing a melt processible fluoropolymer and aggregated inorganic fine particles formed by the cohesive force of the inorganic fine particles.

The aggregated inorganic fine particles formed through the mutual cohesive force of the inorganic fine particles according to the present invention is an aggregate formed through the mutual cohesive force of the inorganic fine particles without the inorganic fine particles melting on the surface and therefore without the fine particles showing interparticle fusion.

The melt processible fluoropolymer can be selected from the polymers known as melt processible fluoropolymer. For example, copolymers (the result of polymerizing two or more monomers) or polymers of monomers selected from tetrafluoroethylene, hexafluoropropylene, chlorotrifluoroethylene, perfluoro(alkyl vinyl ether), vinylidene fluoride, and vinyl fluoride or copolymers of these monomers and a monomer having a polymerizable double bond such as ethylene, propylene, butylene, pentene, hexene, and higher olefins, or monomers having triple bond such as acetylene, propylene, and higher alkynes, can be cited.

As examples of preferred melt processible fluoropolymer, at least one selected from the group consisting of tetrafluoroethylene/perfluoro(alkyl vinyl ether) (hereinafter referred to as PFA), tetrafluoroethylene/hexafluoropropylene copolymer (FEP), tetrafluoroethylene/hexafluoropropylene/perfluoro(alkyl vinyl ether) (EPE), tetrafluoroethylene/ethylene (ETFE), polyvinylidene fluoride (PVDF), polychlorotrifluoroethylene (PCTFE), chlorotrifluoroethylene/ethylene copolymer (ECTFE), can be cited. From among these, with regards to the copolymer of tetrafluoroethylene and perfluoro (alkyl vinyl ether), it is preferable that the alkyl group of perfluoro(alkyl vinyl ether) have one to five carbon atoms, preferably from one to three carbon atoms.

As the melt processible fluoropolymer in the present invention, it is possible to use coagulated particles of melt processible fluoropolymer obtained by coagulating an aqueous dispersion of the aforementioned melt processible fluoropolymers, or it is possible to use pellets created by melt extrusion of these aggregated particles.

The melt processible fluoropolymer composite wherein the inorganic fine particles are dispersed in the melt processible fluoropolymer of the present invention can maintain elongation and the melt moldability of the melt processible fluoropolymer to a large extent even if 15 weight % of weakly aggregated inorganic fine particles is incorporated. Hence there is no particular restriction to the melt viscosity or the molecular weight of these melt processible fluoropolymers, and an appropriate range can be selected according to the application objective. For example, about a melt flow rate (MFR) of 7-40 g/10 minutes is preferred for injection molding.

As the source of inorganic fine particles in the aggregated inorganic fine particles formed through the cohesive force of the inorganic fine particles in the present invention, a colloidal solution (hereinafter this may be referred to as sol) of inorganic fine particles such as silicon dioxide, titanium dioxide, zeolite, zirconium oxide, alumina, antimony pentoxide, silicon carbide, aluminum nitride, silicon nitride, barium titanate, aluminum borate, boron nitride, lead oxide, zinc oxide, tin oxide, cerium oxide, magnesium oxide, cerium zirconate, calcium silicate, zirconium silicate, can be cited. It is preferable for these inorganic fine particles to be nano inorganic fine particles, that is particles 1 µm or less in size. These inorganic fine particles can be used of one kind or a combination of two or more kinds.

Preferred aggregated inorganic fine particles according to the present invention are aggregated inorganic fine particles obtained by mixing a dissolved inorganic salt and a sol of nano inorganic fine particles and preparing a solid material of inorganic salt and nano inorganic fine particles by drying the mixed solution, eluting and removing (washing out) the inorganic salt from the solid material using a solvent, and then drying.

Preferred aggregated inorganic fine particles according to the present invention are aggregated inorganic fine particles formed through and held together by the mutual cohesive force of the inorganic fine particles, and dried at a temperature below that at which mutual surface fusion of the inorganic fine particles occurs, preferably, a temperature where formation of necks junctions) between particles to be described below does not occur.

The temperature where mutual surface fusion of the inorganic fine particles does not occur refers to a temperature which is lower than the temperature where surface fusion occurs significantly, this fusion temperature differing according to the type of inorganic fine particles used. This upper limit can be selected by determining the temperature at which significant surface fusion of the inorganic fine particles occurs.

Whether mutual surface fusion of the inorganic fine particles occurs or not can be determined by observing the electron micrograph of the aggregated inorganic fine particles after drying, and checking that mutual surface fusion of the inorganic fine particles is not seen.

The aggregated inorganic fine particles obtained by drying as described above are aggregates formed only by the mutual cohesive force of the inorganic fine particles. Hence it becomes an aggregate of inorganic fine particles with lower strength than the aggregated inorganic fine particles prepared by sintering a mixture of inorganic salt and inorganic fine particles at a high temperature and mutually melting the inorganic fine particles as described in Japanese Patent Application Number 2001-152030.

The aggregated inorganic fine particles obtained by removing the inorganic salt with a solvent and drying according to the present invention are normally obtained as aggregated coarse particles with a large particle size, or as a lump. However, it is possible to pulverize appropriately and classify as desired, such as by sieving. As the particle size of the aggregated inorganic fine particles in the present invention, a range of average particle size of 50 μm-400 μm, preferably 70 μm-300 μm, more preferably 75-300 μm, is preferred from the standpoint of ease of feeding into the hopper of the extruder. Particle size is determined as described in the example. When pulverizing and classifying the aggregate, it is preferable to carry out this process so that the average particle size falls in the aforementioned range.

The solvent for eluting the inorganic salt from the solid material of inorganic fine particles and inorganic salt can be the same or different from the solvent used in the mixed solution of inorganic fine particles and inorganic salt. However, it is preferable for it to be inactive with respect to the inorganic fine particles. As this solvent, polar solvents, which are poor solvents with respect to the inorganic fine particles, and good solvents with respect to the inorganic salt, can be appropriately selected and used. Water is one example of a preferred solvent. Inorganic salt is eluted and removed using a solvent that elutes the inorganic salt from the solid material; hence it has the role of a hole-forming agent with respect to the obtained aggregate.

As a method preferred for obtaining the aggregate in the present invention, a method that uses at least one kind selected from silica sol, titanium dioxide sol, alumina sol, zeolite sol, and sol of compound oxide of zinc oxide and antimony pentoxide as the nano inorganic fine particles, uses water as the solvent, and uses a water soluble inorganic salt as the inorganic salt, can be cited.

As the water soluble inorganic salt, ammonium salts, alkaline earth metal salts, or alkali metal salts of hydrohalic acid, phosphoric acid, sulfuric acid, nitric acid, and molybdic acid, preferably, potassium nitrate, potassium iodide, ammonium molybdate, sodium dihydrogen phosphate, potassium bromide, potassium chloride, calcium chloride, copper chloride, and calcium nitrate can be cited. These inorganic salts can be used individually or by combining two or more kinds. From among the aforementioned methods, the method that uses silica sol as the source of nano inorganic fine particles is preferred.

If the solvent used is of high purity, aggregated inorganic fine particles of high purity can be obtained. For example, if elution of the residual inorganic salt is carried out repeatedly by using deionized or distilled water, aggregated inorganic fine particles of very high purity can be obtained. When this method is used to obtain an aggregate composed of silica particles with silica sol as the raw material, an silica aggregate of high purity particles can be obtained. The composition of melt processable fluoropolymer obtained by melt-mixing a melt processable fluoropolymer and a high purity aggregate obtained thus can be used to make components requiring purity such as are used in semiconductor device manufacturing.

Also, the aforementioned aggregated inorganic fine particles can be a silica aggregate obtained by dispersing, dissolving, and drying aqueous mixture of a silica sol, an inorganic salt which is the hole forming agent, and an "agent for substitution", for example, MgO or Mg(OH)$_2$, in an aqueous solution, that is a compound or salt that can be later exchanged to introduce another material on the surface of the silica. To accomplish this, the dried mixture is immersed in an aqueous additive solution of another compound or salt, for example, palladium hydroxide, palladium exchanging with the magnesium ion on the silica surface. This technique is described in Japanese Patent Application No. 2001-152030. In this process, the inorganic salt which is the hole forming agent is removed, and the aforementioned agent for substitution may be exchanged with other metal and inorganic compounds, which can be designated as "additive(s)". If no exchange is made, the magnesium compound is the additive. It should be noted that if the sintering described in the aforementioned Japanese Patent Application is carried out, the preferred aggregate according to the present invention cannot be obtained. As the additive to be held on fine particles, for example, inorganic compounds such as magnesium hydroxide, aluminum hydroxide, antimony trioxide, and metals such as palladium, copper, magnesium, iron, aluminum, tin, nickel, cobalt, titanium, platinum, gold, and silver, can be used. Because the additive is dispersed over the high surface area of the silica particles, activity is increased. So that, for example, an additive that is a flame retardant can be used more effectively.

The strength of the aggregated inorganic fine particles of low strength formed through the mutual cohesive force of the nano inorganic fine particles obtained according to the present invention changes according to the type and particle size of the nano inorganic fine particle sol, the pH of the nano inorganic fine particle sol, the type and content of the inorganic salt, and the drying temperature. Hence the strength of the aggregated inorganic fine particles can be controlled by adjusting these conditions.

Also, when melt-mixing the aggregated inorganic fine particles according to the present invention with a melt processible fluoropolymer to disperse the inorganic fine particles in the polymer, the average particle size of the aggregated inorganic fine particles dispersed in the melt processable fluoropolymer, and the dispersed state, change according to the type of melt-mixing device used, the type of fluoropolymer to be melted and mixed, the melt-mixing conditions (temperature and rotation rate of the screw(s), and design of the screw(s)). Therefore, it is necessary to select the melt-mixing condition according to the type of aggregated inorganic fine particles and melt processable fluoropolymer being used in order to properly pulverize and disperse the melt processable fluoropolymer and the aggregated inorganic fine particles physically to the nanolevel of the original primary particles.

In the present invention, the desired melt processable fluoropolymer composition can be obtained by controlling both the melt-mixing conditions and the preparation of the aggregated inorganic fine particles.

A surprising aspect of this invention is that the aggregate inorganic fine particles disperse so well in fluoropolymers. Fluoropolymers have little affinity for polar materials such as silica, or the other inorganic fine particles disclosed herein. It would not have been unreasonable to expect that the inorganic fine particles would resist dispersion into the fluoropolymer, or to put it the other way around, that fluoropolymer would resist dispersion of the inorganic fine particles, with the result that the inorganic fine particles would agglomerate in the fluoropolymer. In spite of such expectations, it is found that the particles disperse well in fluoropolymer, contributing increased tensile modulus and increased elongation without reducing melt processibility by excessively increasing melt viscosity (reducing melt flow rate).

In the case of a porous silica body, the strength is the sum of the adhesive forces between the particles functioning at the contact points of the many silica primary particles forming the porous body; hence it is determined primarily according to the porosity of the porous silica body and the silica primary particle size (Chemie Ingenieur Technik, vol 42, p. 538, 1970). In order to prepare a porous silica body as aggregated inorganic fine particles of low strength, the content of the inorganic salt is increases to increase the porosity, or use of silica fine particles of large average primary particle size, is favorable. Therefore, the average primary particle size should be 50 nm or greater, preferably 90 nm or greater, more preferably, 110 nm or greater, but less than 1 μm, preferably no greater than 600 nm, and more preferably no greater than 400 nm. If the porosity is the same the strength of the aggregate is inversely proportional to the primary particle size, and if the average primary particle size is small, the strength of the aggregate becomes greater and there is a tendency for it not to be completely pulverized in the melt-mixing process. Also, when using aggregated inorganic fine particles of the same strength, melt-mixing at a greater shear stress enables uniform pulverization and dispersion of the nano inorganic fine particles of the aggregated inorganic fine particles in the thermoplastic polymer.

Furthermore, the inorganic salt used according to the present invention has the role of a hole forming agent with respect to the aggregated nano inorganic fine particles; hence the strength of the aggregated inorganic fine particles changes even according to the content of the inorganic salt. The more the content of the inorganic salt is increased with respect to the nano inorganic fine particles, the lower the strength of the aggregated nano inorganic fine particles. However, if the content of the inorganic salt is too high, the aggregated nano inorganic fine particles do not have sufficient strength to survive handling, packaging, and feeding to the hopper of the extruder. Therefore, the content of the inorganic salt in the aggregated inorganic fine particles should be 1-90 volume %, preferably 50-85 volume %, more preferably 60-80 volume %, on a dry basis.

The aggregated inorganic fine particles of the present invention are subjected to two drying steps in the course of their preparation. The first drying step occurs when a solid material of nano inorganic fine particles and inorganic salt is prepared by mixing the inorganic salt and the nano inorganic particle sol dispersed in water and then dried. The second drying step occurs after removing the inorganic salt by using a solvent for eluting the inorganic salt from the solid material of nano inorganic fine particles and inorganic salt, when the remaining solid is dried to remove residual solvent. In both drying steps, the drying temperature should be below that at which interparticle surface fusion of the inorganic fine particles occurs as described above and, preferably, a temperature below that at which formation of necks occurs. The melting point at the surface of the nano inorganic fine particles is lower than the bulk melting point of the inorganic fine particles; hence if, in either drying step, the drying temperature becomes too high, a portion of the surface of the nano inorganic fine particles fuses and the strength of the aggregated inorganic fine particles increases due to the mutual fusion of the adjacent nano inorganic fine particles. Also, inorganic fine particles generally have a crystal structure defect on the particle surface when formed, and this type of defect is thermally unstable; hence rapid rearrangement and movement occurs when heated, and bonding junctions (necks) are formed at the contact points of adjacent inorganic fine particles. The strength of the aggregated inorganic fine particles increases with the increase in neck formation. The principal cause for the neck formation is considered to be mutual surface fusion of adjacent inorganic fine particles. Neck formation starts when either drying temperature is such that the ratio (To/Tm) of the indicated drying temperature (To) to the melting point (Tm) of the inorganic fine particles exceeds 0.23, said temperatures being in degrees Kelvin. Hence it is preferable that the ratio of the drying temperature to the melting point of the inorganic fine particles, in degrees Kelvin, be 0.23 or less. Therefore, if the inorganic fine particles are silica, it is preferable to carry out the drying steps at 150° C. or less, preferably 120° C. or less. It is not necessary that both drying steps be carried out at the same temperature.

As for the strength of the aggregated inorganic fine particles in the present invention, it is preferable that the compressive load, measured when the particle size is about 150 μm, be 40 mN or less, preferably 35 mN or less. It is understood that the relation of strength of the aggregate to the dispersibility of the aggregate depends also on the structure of the melt-mixing device (structure of the screw and the assembly) used, the type of polymer that is melted and mixed, the melt-mixing conditions (temperature and the rotation speed of the screw).

Also, the collapse strength (St) of the aggregated inorganic fine particles according to the present invention should be 1.50 MPa or less, preferably 1.40 MPa or less. The calculation of collapse strength compensates for the effect of difference in particle size as will be described below.

The amount of the aforementioned aggregated inorganic fine particles with respect to the melt processible fluoropolymer is 0.3-70 weight %, preferably 0.5-50 weight %, more preferably 1-30 weight %, based on the combined weights of inorganic fine particles and fluoropolymer. In addition, optimum mixing ratio also depends on the intended application of the melt processible fluoropolymer composition.

The melt processible fluoropolymer composition obtained according to the present invention is a melt processible fluoropolymer composition wherein 1000 nm (1 μm) or less, preferably 600 nm or less, more preferably 400 nm or less (primary particle size) aggregated inorganic fine particles are dispersed in a polymer obtained by melt-mixing the aforementioned aggregated inorganic fine particles and a melt processible fluoropolymer.

By melt-mixing the aggregated inorganic fine particles according to the present invention and a melt processible fluoropolymer, it is possible to obtain a melt processible fluoropolymer composition wherein almost all the fine particles are dispersed at the nano level, that is as primary particles. The state wherein the inorganic fine particles are dispersed in the melt processible fluoropolymer can be observed with an electron micrograph of the composition obtained of melt processible fluoropolymer compound. It is not possible to simultaneously observe particles of greatly different sizes, from the primary inorganic particles with average particle size of about 12 nm to aggregated inorganic fine particles of about 50,000 nm (50 μm). Therefore a sample of the melt processible fluoropolymer composition is prepared by cooling test piece in liquid nitrogen and breaking it. Three areas of the surface exposed by the break are optionally selected randomly with an electron microscope, and the size of the pulverized aggregated inorganic fine particles and primary particles are observed. A distribution chart of the size of the particles observed in the composite and the number thereof is prepared (the particle size on the lateral axis using a logarithmic scale), and the particle size with the greatest ratio of inorganic fine particles is considered as the average particle size. This average particle size can be compared to the size of the primary particles in the sol of inorganic particles from which the aggregate is made. Therefore, if most of the aggregated inorganic fine particles are pulverized and dispersed at the level of the primary particle, most of the particles counted from the electron micrograph will be primary particles, and hence the average particle size will be the particle size of the primary particles that make up the aggregated inorganic fine particles. Also, when the strength of the aggregated inorganic fine particles is high, it will not be so well pulverized and so well dispersed at the primary particle level, and hence the average particle size observed will be a few tens of times to a few hundred times the size of the primary particles. A preferred melt processible fluoropolymer composition has 80% or more, preferably 90% or more, more preferably 95% or more of the number of inorganic fine particles measured by observing the micrograph in the aforementioned range of 1 μm or less, preferably 600 nm or less, and more preferably 400 nm or less.

The polymer nanocomposite of the present invention wherein the inorganic fine particles are dispersed in the polymer at the nanolevel has the merit of improved physical properties at a lower concentration of the aggregated inorganic fine particles is mixed than would be used in the conventional fluoropolymer compound mixture. This improvement is due to the greater interfacial contact area between the nanoparticles and the polymer matrix compared to the conventional fluoropolymer compound mixture wherein the filler is dispersed at the micron rather than at the nano level.

In the present invention, it is preferable to use a twin screw extruder because of its higher shear force to evenly pulverize and disperse the aforementioned aggregated inorganic fine particles with a low strength in the fluoropolymer to the nanolevel of the original primary particles, although this also depends on the type of fluoropolymer used, and its melt viscosity. By changing the rotation speed (rpm) and the design (arrangement of elements) of the screw in the twin screw extruder, it is further possible to evenly pulverize and disperse the aggregated inorganic fine particles in the fluoropolymer to the nanolevel. Also, the melt-mixing temperature of the twin screw extruder should be set keeping in mind the increase the polymer temperature caused by internal heating due to the mechanical energy being input, since as the polymer temperature rises, polymer melt viscosity decreases, and the shear stress applied to the polymer decreases. When rotating at high velocity with a screw design applying shear stress, it is preferable that the melt temperature not exceed the melting point of the fluoropolymer by more than about 50° C.

As regards the final manufactured molded product, since molded products requiring dynamic physical properties and dimensional stability are the objective, applications in various anticipated fields are possible due to the particles being dispersed evenly at the nanolevel, and are not restricted in particular by the present invention. Examples are tubes, sheets, rods, fibers, packing, linings, wire insulation, including primary wire insulation, and cable covers, as well as containers such as trays, and vessels, and pipes, for use in the semi-conductor and biochemical industries. Molding methods are those known in the thermoplastic processing art, including extrusion molding, compression molding, rotomolding, including rotolining, and blow molding.

EXAMPLES

In what follows, the present invention will be explained concretely by citing examples and comparative examples. However, these explanations do not limit the present invention. In the present invention, measurement of the physical properties was carried out according to the following methods.

(1) Melting Point of the Fluoropolymer (Peak Melting Temperature)

A differential scanning calorimeter (Pyris 1 model DSC, made by Perkin Elmer Co.) was used. 10 mg of the sample powder was weighed, placed in an aluminum pan, crimped, and placed in the DSC. The temperature was increased from 150° C. to 360° C. at 10° C./minute. The melt peak temperature (Tm) is taken as the maximum of the melting endotherm.

(2) Melt Flow Rate (MFR)

A melt indexer (made by Toyo Seiki Seisaku-sho Ltd.) equipped with corrosion proof cylinder, die, and piston based upon ASTM D-1238-95 standard was used. 5 g of sample powder was filled in a cylinder maintained at 372±1° C. (for perfluoropolymers; for other fluoropolymers, the temperature is that specified in the table at section 8.2 of the ASTM standard), and after holding for 5 minutes, the polymer was extruded through a die orifice under a load (piston plus weight) of 5 kg. The extrusion rate in units of g/10 minutes is the MFR.

(3) Compressive Load and Collapse-Strength of the Aggregated Inorganic Fine Particles Using a microcompression tester (MCT-W500, made by K. K. Shimatsu Seisakusho), a small amount of the sample was dispersed on a highly rigid stage, a load was applied after measuring the particle size D of each sample particle using an optical microscope attached with MCT-W500, the experimental force P (compressive load) and compressive displacement were measured while applying the compressive load at 103mN/sec, and the collapse strength St (or rupture strength) obtained for the aggregated inorganic fine particles of low strength using the equation provided below (Journal of the Association of Mining Industry of Japan, vol. 81, p. 24, 1965). The experimental force P is reported as the compressive load.

With regards to the collapse strength, five measurements were made on each sample and the average value was taken as the collapse strength (MPa). The collapse strength of the aggregated inorganic fine particles according to the present invention was measured by selecting aggregates with particle size of about 150 μm. However, the average particle size of the commercial silica used as the comparative example is smaller than that of the samples of the present invention; hence the value of the experimental force P is low. However, the collapse strength St, which takes into account the effect of difference in the particle size, is greater.

$$St=2.8\,P/(\pi D^2)$$

St (MPa): Collapse strength (or rupture strength) of the sample

P (N): Experimental force (compressive load) measured with a microcompression tester D (mm): Particle size of the sample (4) Tensile Properties (Tensile Strength, Elongation, Tensile Modulus)

Measurement was taken at elongation speed of 50 mm/minute based on standard JIS K7127 using a sample of thickness about 1 mm prepared by melt compression molding the melt processible fluoropolymer composition at 350° C.

(5) Average Particle Size

A sample of the fluoropolymer composition was placed in liquid nitrogen, three areas of the fabricated separated section were optionally selected with regards to each sample with an electron microscope, the size of the silica particles in the composition was observed, a distribution chart of the particle size and the number thereof was prepared (the particle size on the lateral axis having a logarithmic scale), and the size with the greatest number of inorganic fine particles was considered the average particle size.

a) Silica aggregate of 20 μm or greater: From the result of observing at magnification of 200 (field of view: 450 μm×450 μm), the number of silica particles of particle size 20 μm and greater and the particle size thereof were measured. The first digit in the particle size was eliminated (e.g., 28 μm was reported as 20 μm)

b) Silica aggregate of 5 μm-20 μm: As a result of observing at magnification of 500 (field of view: 180 μm×180 μm), the number of silica particles with particle size of 5 μm-20 μm and the particle size thereof were measured. Also, the number of silica particles corresponding to each particle size counted was multiplied by 6.25 and convert the result to the area observed at magnification of 200.

c) Silica aggregate of 1 μm-5 μm: From the result of observing at magnification of 2000 (field of view: 45 μm×45 μm), the number of silica particles of particle size 1 μm-5 μm and the particle size thereof were measured. Also, the number of silica particles corresponding to the counted particle sizes was multiplied by 100 to convert the result to the area observed at magnification of 200.

d) Silica primary particles or silica aggregate of 500 nm-1 μm: From the result of observing at magnification of 5000 (field of view: 18 μm×18 μm), the number of silica primary particles or silica aggregates of particle size 500 nm-1 μm and the particle size thereof were measured. Also, the number of silica particles corresponding to the counted particle sizes was multiplied by 625 converted the result to the area observed at magnification of 200. The particle size was measured in nm units and the digits under 100 were eliminated (e.g. 650 nm was considered as 600 nm). However, the measured value of the particle size of the silica primary particle was retained as the particle size.

e) Silica primary particles or silica aggregate of 200 nm-500 nm: From the result of observing at magnification of 10000 (field of view: 9 μm×9 μm), the number of silica primary particles or silica aggregates of particle size 200 nm-500 nm and the particle size thereof were measured according to the same method as d) and converted into the result of the area observed at magnification of 200.

f) Silica primary particles or silica aggregate of 200 nm or less: From the result of observing at magnification of 20000 (field of view: 4.5 μm×4.5 μm), the number of silica primary particles or silica aggregates of particle size 200 nm or less and the particle size thereof were measured according to the same method as d) and converted into the result of the area observed at magnification of 200.

(6) State of silica dispersion

In order to compare the pulverized and dispersed state of the aggregated inorganic fine particles, the dispersed state of the silica fine particles was evaluated according to the following standard using the aforementioned results obtained from observation with an electron microscope.

◉: Most of the aggregated inorganic fine particles with particle size about 150 μm have been pulverized and dispersed to the level of the silica primary particles through melt-mixing.

○: There is a small amount of aggregated inorganic fine particles with particle size of about 1 μm-20 μm that have not been totally pulverized.

x: There are many non-pulverized aggregated inorganic fine particles of 20 μm or more.

(Raw Materials)

The raw materials used in the examples and comparative examples according to the present invention are as follows.

(1) PFA
PFA 350J (melting point 309° C., melt flow rate 2 g/10 min) made by DuPont-Mitsui Fluorochemicals Co., Ltd.

(2) Silica Sol
Made by Nissan Chemical Industries, Ltd.
Snowtex® MP2040 (average silica primary particle size: 190 nm). Designated herein as S1.
Snowtex® MP1040 (average silica primary particle size: 110 nm). Designated herein as S2.
Snowtex® ST-YL (average silica primary particle size: 57 nm). Designated herein as S3.
Snowtex® 30 (average silica primary particle size: 12 nm). Designated herein as S4.

(3) Synthetic silica nanoparticles. Made by Nippon Aerosol, Aerosil 300 (average particle diameter: 7 nm). Designated herein as "Aerosil".

(4) Commercial porous silica (sintered). Made by Fuji Silysia Chemical Ltd., C-1504 (average particle diameter: 4 μm). Designated herein as R1.

(5) Commercial porous silica (sintered). Made by Denki Kagaku K.K., FB-74 (average particle size: 32 μm). Designated herein as R2.

Production of Aggregated Silica Fine Particles S1, S2, S3, and S4

245.7 g of silica sol (40 weight % silica) in which the dispersed silica fine particles have the average particle sizes (primary particle size) shown in Table 1 was dispersed in 1 liter of deionized water in a beaker, and 292.3 g of potassium bromide (KBr) as the hole forming agent was added, agitated until the KBr dissolved, and then 60 wt % nitric acid was added to adjust the pH to about 4.0 in order to promote the coagulation of the silica fine particles. Next, the agitated mixed solution was transferred to a container made of fluoropolymer and dried at 80° C. to constant weight. After drying, the resulting cake was pulverized, classified with sieves (Japanese Standard) of 300 μm and 75 μm mesh, and powder obtained of average particle sizes 75 μm-300 μm. 100 g of the powder and 2.5 L of deionized water were added into a beaker and agitated for 30 minutes at 200 rpm while heating at 80° C. Thereafter, the beaker was left standing to allow the precipitation the solid material, and the clear fluid at the top containing the eluted KBr was removed. After removing the clear fluid at the top, the sample was dried for about 10 hours at 120° C., vacuum dried additionally for 3 hours at 120° C., and samples obtained of aggregated silica fine particles S1, S2, S3, and S4, with KBr removed and only the $SiO_2$ skeleton remaining. The collapse strengths of the samples are shown in Table 1.

Figure 1:
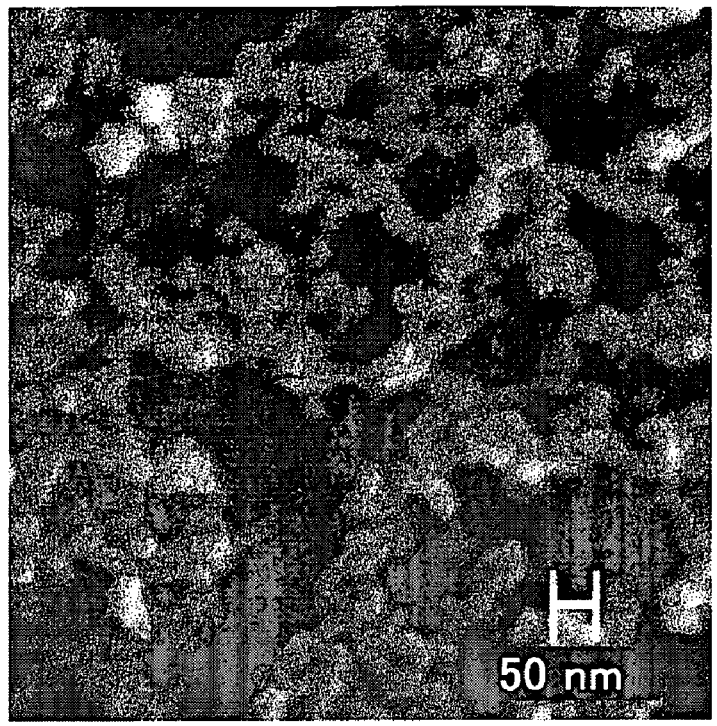
FIG. 1 is an electron micrograph of aggregated silica fine particles (not sintered) used in the present invention.

Also, an electron micrograph of sample S4 is shown in FIG. 1. It is apparent from FIG. 1 that the silica primary particles form a three-dimensional skeleton due only to the physical cohesive force, that is not through interparticle fusion.

Production of Sintered Aggregated Silica Fine Particles S5

Figure 2:
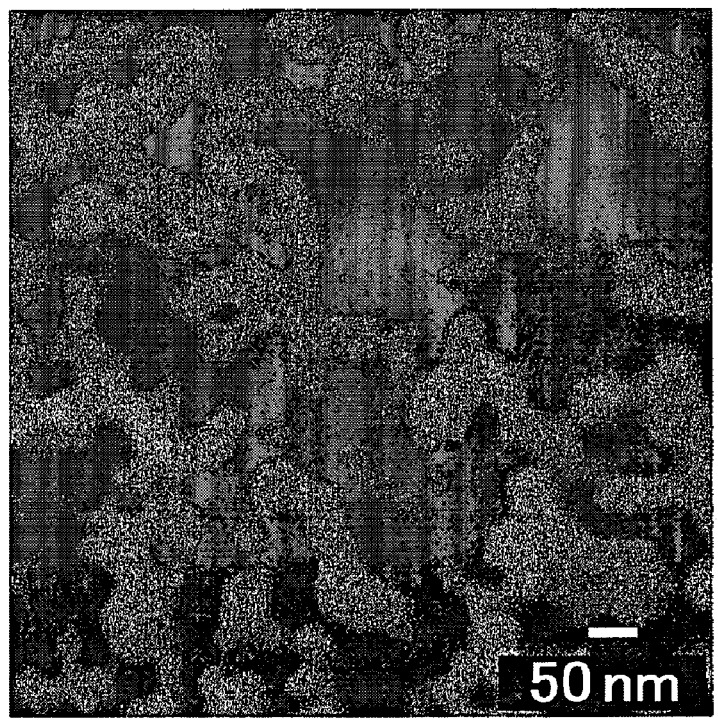
FIG. 2 is an electron micrograph of silica fine particles fired at 600° C. used in Comparative Example 1.

245.7 g of silica sol (40 weight % silica, average particle size (0.012 μm) shown in Table 1) was dispersed in 1 liter of water in a beaker, and 292.3 g of KBr was added, and agitated until the KBr totally dissolved. 60 wt % nitric acid was added to adjust the pH about 4.0 in order to promote the coagulation of the particles in the silica sol. Next, the agitated mixed solution was transferred to a container made of fluorocarbon polymer and dried at 80° C. to constant weight. After drying, the resulting cake was pulverized, classified using sieves of 300 μm and 75 μm mesh, obtaining thereby powder of average particle sizes 75 μm-300 μm. This powder was placed on a dish and sintered for 2 hours at a temperature of 600° C. as shown in Table 1 with a tubular furnace (made by ISUZU, EKRO-23). After the sintering, 100 g of the solid material and 2.5L of pure water were mixed in a beaker and agitated while heating at 80° C. Thereafter, the beaker was left standing to precipitate the solid material. The clear fluid at the top, containing the eluted KBr, was removed. After removing the clear fluid at the top, the sample was dried for about 10 hours at 120° C., vacuum dried additionally for 3 hours at 120° C., and a sample obtained of aggregated silica fine particles S5, with KBr removed and only the $SiO_2$ skeleton remaining. The electron micrograph of the sample obtained is shown in FIG. 2. It is apparent from FIG. 2 that the aggregated silica primary particles form a three-dimensional skeleton through mutual fusion of the silica primary particles.

The commercial sintered aggregated silica fine particles R1 and R2 were analyzed for compressive load and collapse strength: (R2) 0.18 mN, and 10.03 MPa; R1 1242.06 mN, and 1081.61 MPa.

for 1 minute 40 seconds at 340° C., 240 rpm using as the melt-mixing device that made by Toyo Seiki Seisaku-sho Ltd., KF-70V compact segment mixer, in combinations of high shear that displaced the phases of five kneading discs by a pitch of 0.5, and obtained the melt processible fluoropolymer compositions shown in Table 2. The MFR and tensile properties of the melt processible fluoropolymer compositions were measured. Also, the pulverized and dispersed state of the silica was evaluated using electron microscopy. The results obtained are shown in Table 2.

The commercial porous silica (R1) and commercial porous silica (R2) have a high collapse strength; hence they could not be pulverized evenly when melted and mixed, and measurement of the physical properties was not carried out.

Comparative Example 2 is an example of directly melt-mixing commercial silica nano particles of particle size 7 nm with melt processible fluoropolymer.

TABLE 1

| Sample number | | S1 | S2 | S3 | S4 | S5 |
|---|---|---|---|---|---|---|
| Average silica primary particle size (μm) | | 0.190 | 0.110 | 0.057 | 0.012 | 0.012 |
| Drying temperature (° C.) | | | 120° C. (drying) | | | 600° C. (sintering) |
| Silica aggregated body | Particle size (μm) | average 150 | average 150 | average 150 | average 150 | average 150 |
| | Compressive load (mN) | 15.50 | 34.17 | 48.05 | 99.63 | 231.62 |
| | Collapse strength (MPa) | 0.61 | 1.35 | 1.90 | 3.95 | 9.13 |

Examples 1-4, Comparative Examples 1-2, and Reference Example 1

The aforementioned aggregated silica fine particles S1-S4 (Examples 1-4) and sintered aggregated silica fine particles S5 (Comparative Example 1) were melt mixed with PFA 350J The physical properties of fluoropolymer without are shown as Reference Example 1.

Incidentally, the concept of the dispersed state of the silica pulverized in the melt-mixing process, and the procedure for producing the aggregated silica fine particles used in the present invention, is shown in FIG. 3.

TABLE 2

| | | Aggregated Silica | | |
|---|---|---|---|---|
| | PFA Content (wt %) | content (wt %) | Sample | Primary Particle Size (nm) | Collapse Strength (MPa) |
| Example 1 | 97 | 3 | S2 | 110 | 1.35 |
| Example 2 | 97 | 3 | S1 | 190 | 0.61 |
| Example 3 | 92 | 8 | S1 | 190 | 0.61 |
| Example 4 | 85 | 15 | S1 | 190 | 0.61 |
| Comparative Example 1 | 97 | 3 | S5 | 12 | 9.18 |
| Comparative Example 2 | 97 | 3 | "Aerosil" | 7 | — |
| Reference Example 1 | 100 | 0 | — | — | — |

| | Composite Properties | | | | |
|---|---|---|---|---|---|
| | MFR (g/10 min) | Tensile Strength (MPa) | Elongation (%) | Tensile Modulus (MPa) | Silica Distribution | Dispersed SiO2 Average Size (nm) |
| Example 1 | 1.85 | 22.5 | 330 | 510 | ○ | 110 |
| Example 2 | 2.26 | 33.6 | 395 | 517 | ◎ | 190 |
| Example 3 | 2.03 | 30.5 | 366 | 570 | ◎ | 190 |
| Example 4 | 1.77 | 22.4 | 306 | 747 | ◎ | 190 |
| Comparative Example 1 | 1.50 | 12.5 | 18 | 535 | X | 20000 |
| Comparative Example 2 | 1.58 | 29.4 | 325 | 490 | Re-agglomerated | 4000 |
| Reference Example 1 | 2.01 | 27.5 | 310 | 450 | — | — |

In Example 1, the collapse strength of the aggregated silica fine particles used is weaker than that of Comparative Example 1; hence most of the aggregated silica fine particles were pulverized during the melt-mixing process. However, a small amount of aggregated inorganic fine particles of size about 1 μm-20 μm remained that were not completely pulverized.

Figure 4:
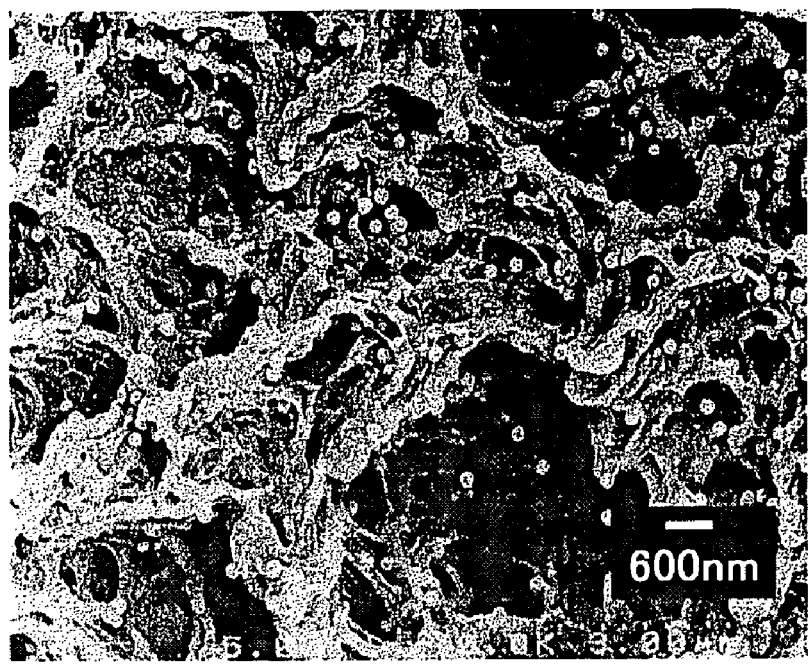
FIG. 4 is an electron micrograph of the separated section of a sample of the melt processable fluoropolymer composition of Example 2.

In Example 2, aggregated silica fine particles with weak collapse strength were used. As a consequence, aggregated silica fine particles of size about 150 μm were pulverized and dispersed up to the level of the silica primary particles (particle size 190 nm) during the melt-mixing process (FIG. 4).

Most of the aggregated silica fine particles was pulverized to the level of the silica primary particles even in Examples 3 and 4 wherein the content of the aggregated silica fine particles with the same collapse strength was increased from 3 weight % to 8 weight % and 15 weight %.

When a general filler of micron scale was incorporated into the polymer, the MFR and the elongation percent decreased with increase in the content of filler. However, the MFR and elongation percent did not decrease even when the aggregated silica fine particles were increased to 8 weight % and 15 weight % and remained at about the same level as without filler (Reference Example 1). This is considered to be the result of the nanolevel dispersion of the silica primary particles in the fluoropolymer. Also, the tensile modulus increased with increase in the content of the aggregated silica fine particles.

Figure 5:
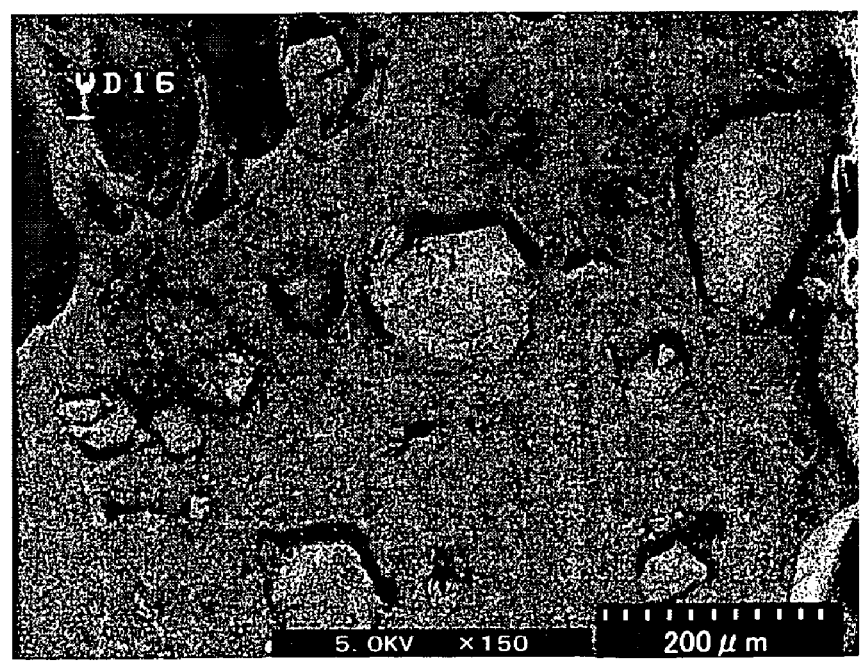
FIG. 5 is an electron micrograph of the separated section of a sample of the melt processable fluoropolymer composition of Comparative Example 1.

In Comparative Example 1, aggregated sintered silica fine particles with the strongest collapse strength produced by sintering were used, hence the aggregated silica fine particles could not be pulverized in the melt-mixing process, and non-pulverized aggregated silica fine particles with particle size of about 50 μm remained (FIG. 5).

Figure 6:
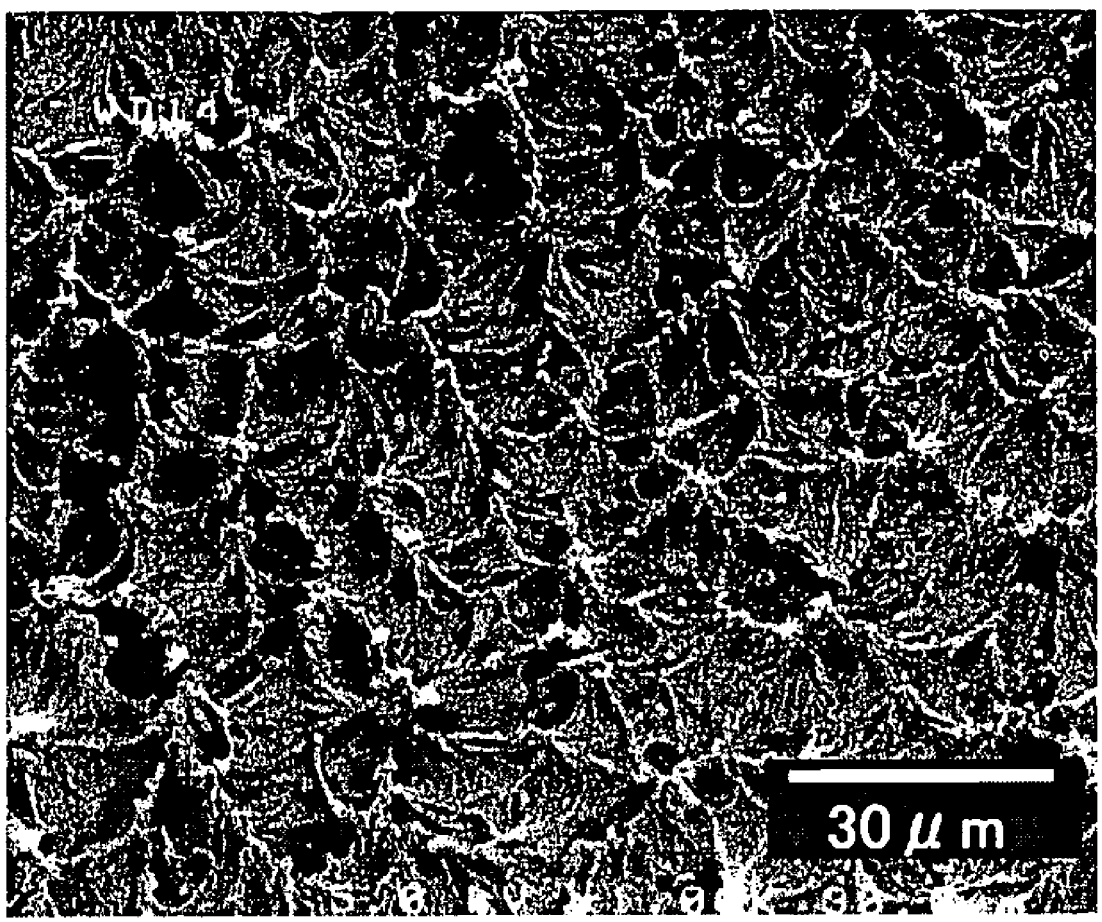
FIG. 6 is an electron micrograph of the separated section of a sample of the melt processable fluoropolymer composition of Comparative Example 2.

In Comparative Example 2, reagglomeration of the silica nanoparticles occurred in the melt-mixing process due to the strong attractive force between the silica nanoparticles, as a result of having directly melted and mixed with commercial silica nanoparticles of particle size 7 nm, and silica aggregate of average particle size 4 μm being formed (FIG. 6). From the result of Comparative Example 2, it is apparent that in the method of directly melt-mixing nanoparticles with melt processible fluoropolymer, it is not possible to disperse the nanoparticles in the polymer at the nanolevel. Reagglomeration affects the melt flow rate (MFR) as can be seen in Table 2. At 3 wt % loading MFR is 1.58 compared to 2.01 for the fluoropolymer alone. In Example 4, with 15 wt % loading of aggregated fine silica, MFR drops only to 1.77, well above that of Comparative Example 2 even though the loading is five times as high.

In the present invention, it was possible to physically pulverize and disperse the aggregated inorganic fine particles of low strength that were mixed through the shear stress generated in the melt-mixing device to the nano inorganic fine particle level by melt-mixing a melt processible fluoropolymer and aggregated inorganic fine particles of low strength formed due to the relatively weak cohesive force of the adjacent particles of the nano inorganic fine particles in advance.

According to the present invention, a melt processible fluoropolymer composition having excellent dynamic physical properties and dimensional stability wherein the inorganic fine particles are dispersed at the level of the primary particles is provided.

According to the present invention, a melt processible fluoropolymer composition is provided having excellent dynamic physical properties and dimensional stability while maintaining to some extent the percent elongation and melt moldability of the melt processible fluoropolymer obtained by melt-mixing a melt processible fluoropolymer and aggregated inorganic fine particles through shear force, and physically pulverizing and dispersing the aggregate in the melt processible fluoropolymer to the original inorganic fine particles size (primary particles).

According to the present invention, a melt processible fluoropolymer can be made into a nanocomposite due to being able disperse the inorganic fine particles in the melt processible fluoropolymer to the nanolevel.

Molded melt processible fluoropolymer nanocomposite products capable of being provided according to the present invention have excellent dynamic physical properties, dimensional stability, fire resistance, melt moldability, abrasion/wear-proof characteristics, etc. and hence can be applied to various molded products.

In the melt processible fluoropolymer composition in the present invention, the inorganic fine particles are dispersed in the polymer at the nanolevel; hence compared to the conventional fluoropolymer compound mixture wherein fillers are dispersed at the micron level, there is a merit of anticipated improvement in the physical properties even if a smaller amount of the aggregated inorganic fine particles is used than in the conventional fluoropolymer compound mixture.

According to the present invention, a melt processible fluoropolymer composition capable of being applied in various anticipated fields due to the particles being dispersed evenly at the nanolevel is provided. Applications for use in tubes, sheets, rods, fibers, packing, linings, wire insulation, including primary wire insulation, and cable covers are possible.

What is claimed is:

1. A composition of melt processible fluoropolymer and inorganic fine particles of average particle size 1 μm or less, said inorganic fine particles being dispersed in said fluoropolymer, said composition being obtained by melt-mixing said melt processible fluoropolymer and aggregated said inorganic fine particles, said aggregated inorganic fine particles being obtained by
   (a) drying a mixed solution of inorganic fine particles and an inorganic salt to obtain a solid material,
   (b) removing the inorganic salt from this solid material using a solvent, and
   (c) drying said solid material to obtain said aggregated inorganic fine particles,
both said drying steps being done below the temperature at which surface fusion between the inorganic fine particles occurs, whereby said aggregates are the result of the mutual cohesive force of the inorganic fine particles.

2. The melt processible fluoropolymer composition of claim 1 wherein said aggregated inorganic fine particles are in the size range of 50 μm to 400 μm.

3. The melt processible fluoropolymer composition of claim 1, wherein the collapse strength of the aggregated inorganic fine particles is 1.5 MPa or less.

4. The melt processible fluoropolymer composition of claim 1, wherein the average primary particle size of the inorganic fine particles is 1 μm or less.

5. The melt processible fluoropolymer composition of claim 1, wherein the compressive load of the aggregated inorganic fine particles is 40 mN or less.

6. The melt processible fluoropolymer composition of claim 1, wherein the 80% or more of the inorganic fine particles dispersed in the polymer have a particle size of 600 nm or less.

7. The melt processible fluoropolymer composition of claim 1 characterized by the fact that the inorganic fine particles are at least one selected from the group consisting of silicon dioxide, titanium dioxide, aluminum oxide, and compound oxide of zinc oxide and antimony pentoxide.

8. The melt processible fluoropolymer composition of claim 1 characterized by the fact that the inorganic salt is at least one kind selected from the group consisting of ammonium salts, alkaline earth metal salts, and alkali metal salts of hydrohalic acid, phosphoric acid, sulfuric acid, nitric acid, and molybdic acid.

9. The melt processible fluoropolymer composition of claim 8 characterized by the fact that the inorganic salt is at least one selected from the group consisting of potassium bromide, potassium chloride, ammonium molybdate, sodium dihydrogen phosphate, calcium chloride, and ammonium bromide.

10. The melt processible fluoropolymer composition of claim 1 characterized by the fact that the drying is carried out at a drying temperature such that the ratio (To/Tm) of the indicated drying temperature (To) to the melting point (Tm) of the inorganic fine particles is 0.23 or less, said temperatures being in degrees Kelvin.

11. The melt processible fluoropolymer composition of claim 1, wherein the melt processible fluoropolymer is at least one kind selected from the group consisting of polymers or copolymers of monomers selected from tetrafluoroethylene, hexafluoropropylene, chlorotrifluoroethylene, perfluoro (alkyl vinyl ether), vinylidene fluoride, and vinyl fluoride or copolymers of these monomers and ethylene or propylene.

12. The melt processible fluoropolymer composition of claim 1 characterized by the fact that the MFR of the melt processible fluoropolymer composition is at least 50% of the MFR of the melt processible fluoropolymer itself.

13. The melt processible fluoropolymer composition of claim 1 characterized by the fact that the elongation of the melt processible fluoropolymer composition is at least 50% of the elongation of the melt processible fluoropolymer.

14. Molded articles of the melt processible fluoropolymer composition of claim 1.

15. Molded articles of claim 13 wherein said articles are selected from the group consisting of tubes, rods, fibers, sheets, packing, trays, vessels, and pipes, linings for pipes and containers, jackets, and insulation for wire and jacket for cable.

* * * * *